Sept. 4, 1956  E. W. RHOADES  2,761,370
VEHICLE VENTILATION
Filed July 10, 1953  2 Sheets—Sheet 1
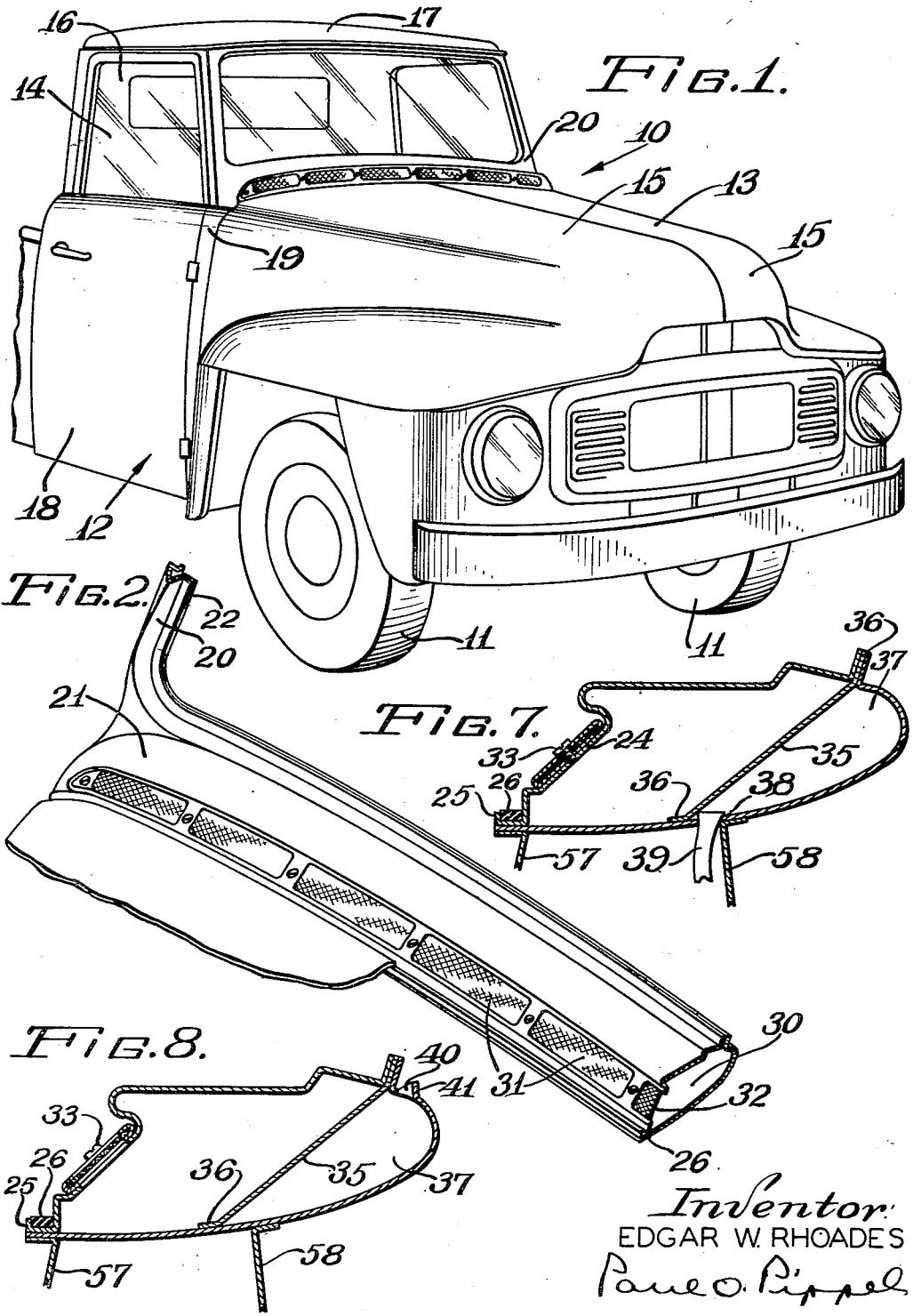
Inventor:
EDGAR W. RHOADES
Paul O. Pippel
Atty.

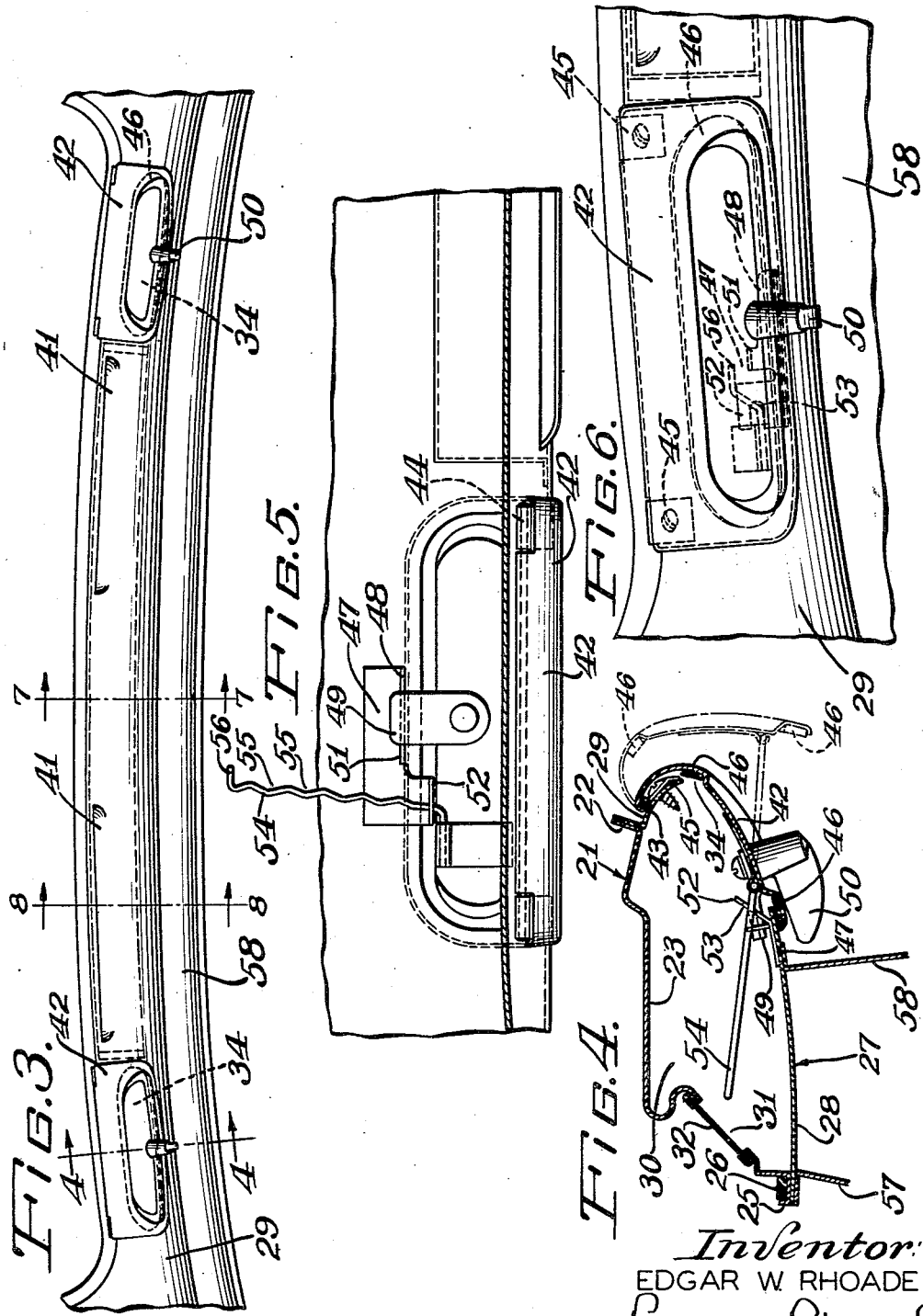

United States Patent Office 2,761,370
Patented Sept. 4, 1956

2,761,370

VEHICLE VENTILATION

Edgar W. Rhoades, Fort Wayne, Ind., assignor to International Harvester Company, a corporation of New Jersey Application July 10, 1953, Serial No. 367,241

11 Claims. (Cl. 98—2)

This invention relates to improvements in motor vehicle body structures and more particularly to a simple, efficient ventilating air admission and distributing means for supplying and directing air to the interior of the operator's compartment.

It is the primary objective of the present invention to simplify and increase the ventilating efficiency of the ventilating air distributing means disclosed in patent application, Serial No. 302,749, filed August 5, 1952, titled "Vehicle Structure," by Fred A. Lee, and assigned to the assignee of the present invention. The present application is an improvement over patent application, Serial No. 302,749.

A further object is the provision of a cold air-receiving chamber, spaced below the windshield frame and above the hood panel, extending from one side of the operator's compartment to the opposite side whereby air is injected into the chamber through a forwardly facing wall when the vehicle is in motion and is directed to the interior of the operator's compartment through ports disposed substantially in horizontal alignment with the forwardly facing wall and formed in a rearwardly facing wall of the chamber.

A still further object is the provision of a closure member movable to close a ventilating air opening formed in a vehicle body cowl bar and which is adapted to lie substantially flush with the cowl bar surface adjacent the opening and will not materially change the appearance of the cowl bar when in its closed position.

Another object is to provide a ventilating opening in the curved, rearwardly facing surface of the vehicle cowl bar and a closure member shaped to conform to the surface of the cowl bar whereby the closure member functions as a deflector when opened to direct the air emitted from the ventilating opening downwardly into the operator's compartment.

Still another object is the provision of simple but yet durable structure for locking a closure member in its closed position and for maintaining the closure member in a plurality of open positions.

An important object of the invention is to provide vehicle body structure constructed and arranged to form a cold air-receiving chamber and a hot air-receiving chamber disposed within the cold air-receiving chamber and to provide ventilating openings in a rearwardly facing wall adjacent each end of the hot air-receiving chamber for permitting air to flow from the cold air-receiving chamber to the interior of the operator's compartment.

The foregoing and other important objects and desirable features inherent in and encompassed by the invention, together with many of the purposes and uses thereof, will become readily apparent from a reading of the ensuing description in conjunction with the annexed drawings, in which, Figure 1 is a perspective view of the front portion of a motor truck embodying the invention;

Figure 2 is a fragmentary perspective view, partially cut away, of the forward portion of the operator's compartment or cab;

Figure 3 is a front elevational view of a section of the vehicle windshield frame, cowl bar, and instrument panel;

Figure 4 is a cross sectional view taken substantially along line 4—4 of Figure 3;

Figure 5 is an enlarged plan view partly in section of ventilating port closure member;

Figure 6 is a front elevational view of the closure member shown in Figure 6;

Figure 7 is a cross sectional view taken substantially along line 7—7 of Figure 3; and Figure 8 is a cross sectional view taken substantially along line 8—8 of Figure 3.

Referring to the drawings in detail, wherein like reference characters designate like elements throughout the various views, the front end of a motor truck 10 is shown resiliently suspended off the road by a pair of steerable, ground-engaging wheels 11 in a conventional manner. A vehicle body, designated generally by numeral 12, is mounted on the chassis frame (not shown) and includes an engine compartment 13 and an enclosed operator's compartment or cab 14 longitudinally spaced rearwardly of the engine compartment. As best shown in Figure 1, the top wall of the engine compartment 13 is defined by a pair of symmetrical hood panels 15.

The operator's compartment 14, as stated hereinbefore, is supported on the chassis frame rearwardly of the engine and includes a back panel 16, the upper marginal edge of which is fixedly secured to the rearwardmost edge of a roof 17. A pair of doors 18 have their forward edges pivotally connected, respectively, to transversely spaced pillar post 19 (only one is shown in Figure 1) and serve as the sides of the operator's compartment 14. In the vehicle structure shown in the drawings, the windshield frame 20 and the forwardly extending cowl panel 21 are formed from a unitary stamping. The top marginal edge of the windshield frame 20 is rigidly secured to the forwardmost edge of the roof 17 by any suitable means and the lower, transversely spaced ends of the unitary stamping are similarly connected to the pillar posts 19, as shown in Figure 1.

The windshield opening is outlined by a continuous, inwardly directed flange 22. The cowl panel 21 includes a horizontally disposed section 23 extending forwardly from the base of the windshield frame 20 which is vertically spaced above the hood panels 15. An integrally formed inclined section 24 depends angularly from the leading edge of the horizontal section 23 and has its lower edge in the form of an upwardly-facing channel 25 which serves as a groove for retaining a strip 26 of rubber or like material. As shown in Figure 2, the rearwardmost edge of the hood panels 15 abut the strip 26 when in their closed positions to prevent the entrance of water, dirt, etc. into the engine compartment 13.

A cowl bar 27, extending transversely from one side of the operator's compartment 14 to the opposite side, has its leading edge welded to the underside of the web of channel 25. The cowl bar 27 includes a generally horizontally disposed, rearwardly extending section 28 vertically spaced below the horizontal section 23 of the cowl panel 21, and an upwardly and forwardly curved section 29, integrally formed therewith, disposed rearwardly of the windshield frame 20. It will be noted that the curved section 29 is substantially C-shaped in cross section and is similar, in this respect, to the cowl bars provided in most present day automotive vehicles. It will be noted that the transversely spaced ends of the cowl panel sections 23 are curved downwardly from the general horizontal plane of the section 23 and extend below the level of cowl bar section 28. The end portions as well as the trailing edge portions of the cowl bar 27 are flanged and the flanges are adapted to abut and are welded to the depending ends of the section 23 and the trailing edge portions of the cowl panel section 23, respectively. By virtue of the above described structure, it will be appreciated that a chamber 30, extending transversely across the vehicle and vertically spaced below the windshield frame 20 and above the hood panels 15, is formed. It will also be noted that portions of the chamber 30 are disposed forwardly and rearwardly of the windshield frame 20.

The inclined section 24 of the cowl panel 21 serves as the forwardly facing wall of the chamber 30 and is provided with a plurality of elongated, transversely spaced openings 31 for permitting air to be forced into the chamber when the vehicle is in motion. A screen assembly 32 is fastened to the inclined section 24 by means of screws 33 to prevent bugs and other foreign elements from entering the chamber 30. The air received in the chamber 30 is discharged to the interior of the operator's compartment 14 through a pair of transversely spaced, identical ports 34 formed in the curved section 29 of the cowl bar 27. It will be observed from Figure 3 that each port 34 is located adjacent a respective end of the chamber 30.

A partition 35, disposed within the chamber 30, between the ports 34, is provided with a peripheral flange 36 which is welded to the cowl bar 27 and the cowl panel 21, as best shown in Figure 3. The end portions of the partition 35 extend rearwardly and are welded to the curved section 29 of the cowl bar 27. The partition 35 and the portion of the cowl bar 27 encircled by the flange 36 define a hot air-receiving chamber 37, the ends thereof being defined by the end portions of the partition 35. The mid portion of the rearwardly extending section 28 is provided with an opening 38 to which one end of a pipe 39 is secured. The pipe 39 leads from a convention air heater (not shown). The hot air received in the chamber 37 is emitted at the base of the windshield frame 20 through a pair of elongated slots 40 formed in the top surface of the curved section 29. The rearwardmost edge of each slot 40 is provided with a vertically extending deflector 41 for directing the heated air forwardly to the base of the windshield frame 20 to prevent the formation of ice and moisture on the windshield (not shown).

The volume and direction of air flowing from the cold air-receiving chamber 30 to the interior of the operator's compartment 14 through the ports 34 is controlled by the positioning of a pair of closure members, designated generally by numeral 42. The upper edge 43 of each closure member 42 is rolled over to form a sleeve-like bearing for receiving a pivot pin 44. The ends of the pivot pin 44 are supported by a pair of brackets 45 secured to the curved section 29 adjacent the upper edge of a respective port 34. From the foregoing, it will be appreciated that the closure members 42 are capable of swinging vertically about horizontally disposed axes between a fully closed position and a fully opened position (shown in dotted lines in Figure 4). It will also be noted that the closure members 42 are shaped to conform to the surface curvature of the cowl bar 27 and, hence lie substantially flush with the cowl bar surfaces adjacent the ports 34 when in their closed positions. A strip 46 of rubber, cork, or like material is cemented to the underside of each closure member 42 adjacent its marginal edge which is adapted to abut the surface of the cowl bar 27 outlining the port 34 associated therewith when the closure member is in its closed position as shown in Figures 3, 4, 5, and 6 to preclude the entrance of air, water, and dirt into the interior of the operator's compartment 14.

As shown in Figures 4, 5, and 6, a bracket 47 is rigidly secured to the cowl bar 27 adjacent the lower edge of each port 34. Each bracket 47 has a ramp-like keeper portion 48 formed thereon which is engaged by a latch member 49 rotatably supported by the closure member 42. As best shown in Figure 6, when the knob 50, which is operatively connected to the latch member 49, is rotated in a clockwise direction when the closure member is in its closed position, the latch member will be moved into engagement with the keeper portion 48 to lock the closure member in its closed position. A stop lug 51 is provided on the bracket 47 to limit the locking movement of the latch member 49.

Each closure member 42 is capable of being maintained in a multitude of open positions in order to control the volume and direction of air being emitted into the operator's compartment 14 from the cold air-receiving chamber 30. Each bracket 47 has a projection 52 formed thereon provided with an open-ended slot 53. The slot 53 extends in a direction parallel to the pivotal axis of the closure member 42 associated therewith. An elongated rod-like spring member 54, having one end pivotally connected to the underside of the closure member 42, is adapted to extend through the slot 53. The spring member 54 is yieldably urged toward the bottom of the slot 53 into frictional engagement with the projection 52. As best shown in Figure 5, a plurality of notches 55 are formed on the spring member 54 which are adapted to abut the projection 52. Each notch 55 represents a particular open position of the closure member 42. It will also be noted that the end of the spring member 54 opposite the end pivotally connected to the closure member is provided with an off-set extension 56 which engages the projection 52 to limit the outward pivoting movement of the closure member. It will be appreciated that the above described structure locking the closure members 42 and for holding them in various open positions is simple to manufacture and assemble when compared to similar structures of the prior art.

As stated hereinbefore, the closure members 42 are shaped to conform to the curved section 29 of the cowl bar 27 whereby the appearance of the cowl bar 27 is not materially altered by providing ventilating ports therein. Furthermore, inasmuch as the closure members 42 are curved, as best shown in Figure 4, and pivotally connected to the cowl panel 27 along the upper edge of the ports 34, the flow of air through the ports is directed downwardly and forwardly toward the dash panel 57 and the instrument panel 58 to prevent the creation of unpleasant and deleterious drafts.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having an operator's compartment, a hood panel spaced forwardly of said operator's compartment and overlying the vehicle engine, and a windshield frame extending transversely across the forward, upper extremity of said operator's compartment; structure defining an enclosed cold air-receiving chamber extending transversely from side to side of said operator's compartment and being spaced below said windshield frame and above said hood panel and a transversely extending, enclosed hot air-receiving chamber adjacent to and of less transverse length than said cold air-receiving chamber, said hot air-receiving chamber being partially defined by a top wall portion disposed rearwardly of the base of said windshield frame adapted to receive heated air and direct the heated air rearwardly of the base of said windshield frame through said top wall portion, each of the transversely spaced terminal ends of said hot air-receiving chamber being transversely spaced from a respective transverse end of said cold air-receiving chamber, said cold air-receiving chamber having a forwardly facing wall spaced forwardly of said windshield frame provided with screened openings above said hood panel for receiving air from without said operator's compartment and a rearwardly facing wall spaced rearwardly of said windshield frame provided with ports for establishing air flow communication between said cold air-receiving chamber and the interior of said operator's compartment, said ports being transversely spaced between the respective terminal ends of said cold and hot air-receiving chambers.

2. In a motor vehicle having an operator's compartment, a hood panel spaced forwardly of said operator's compartment and overlying the vehicle engine, and a windshield frame extending transversely across the forward, upper extremity of said operator's compartment; structure defining an enclosed cold air-receiving chamber adapted to receive air from without said operator's compartment extending transversely from side to side of said operator's compartment and being spaced below said windshield frame and above said hood panel and a transversely extending, enclosed hot air-receiving chamber adjacent to and of less transverse length than said cold air-receiving chamber, each of the transversely spaced terminal ends of said hot air-receiving chamber being transversely spaced from a respective transverse end of said cold air-receiving chamber, said structure including a cowl bar secured to said windshield frame having a substantially horizontal, forwardly extending section forming the bottom wall of said chambers and an upwardly and forwardly curved section serving as the rearwardly facing wall of one of said chambers and as a portion of the rearwardly facing wall of the other of said chambers, said horizontal section having an opening therein for permitting the flow of heated air to said hot air-receiving chamber, said curved section having a portion thereof disposed rearwardly of the base of said windshield frame and transversely extending slots formed therein for directing the heated air discharge at the base of said windshield frame, said curved section further being provided with ports for establishing air flow communication between said cold air-receiving chamber and the interior of said operator's compartment.

3. The combination as set forth in claim 2, in which said ports are transversely spaced between the respective terminal transverse ends of said cold and hot air-receiving chambers.

4. In a motor vehicle having an operator's compartment, a hood panel spaced forwardly of said operator's compartment and overlying the vehicle engine, and a windshield frame extending transversely across the forward, upper extremity of said operator's compartment; structure defining an enclosed cold air-receiving chamber extending transversely from side to side of said operator's compartment and being spaced below said windshield frame and above said hood panel and a transversely extending, enclosed hot air-receiving chamber adjacent to and of less transverse length than said cold air-receiving chamber, said hot air-receiving chamber being adapted to receive heated air and having a wall portion disposed rearwardly of the base of said windshield frame and provided with means for the passage of heated air from the hot air-receiving chamber to an area rearwardly of the base of said windshield frame, each of the transversely spaced terminal ends of said hot air-receiving chamber being transversely spaced from a respective transverse end of said cold air-receiving chamber, said cold air-receiving chamber having a forwardly facing wall spaced forwardly of said windshield frame provided with screened openings above said hood panel for receiving air from without said operator's compartment and rearwardly facing, substantially C-shaped in cross section, wall portions have one edge thereof secured to said windshield frame, said C-shaped wall portions being provided with ports substantially in horizontal alignment with said forwardly facing wall for establishing air flow communication between said cold air-receiving chamber and the interior of said operator's compartment, said ports being transversely spaced between the respective transverse terminal ends of said cold and hot air-receiving chambers.

5. The combination as set forth in claim 4, in which, each port is provided with a closure member pivotally mounted on said C-shaped wall for movement about a substantially horizontal axis spaced above said port to close said port and lie substantially flush with the C-shaped wall surface adjacent the port, said closure members serving as deflectors when pivoted relative to said C-shaped wall about said horizontal axes to direct the air from said cold air-receiving chamber downwardly into said operator's compartment.

6. In a motor vehicle having an operator's compartment, a hood panel spaced forwardly of said operator's compartment and overlying the vehicle engine, and a windshield frame extending transversely across the forward, upper extremity of said operator's compartment; structure defining an enclosed cold air-receiving chamber and an enclosed hot air-receiving chamber, including a cowl panel integrally formed with said windshield frame including a horizontal section extending forwardly of said windshield frame and an inclined section depending angularly therefrom adapted to serve as the top and forward walls, respectively, of said cold air-receiving chamber, said inclined section being provided with screened openings above said hood panel for permitting cold air to enter said chamber; a cowl bar having one edge secured to said inclined section and being formed with a rearwardly extending section and an upwardly and forwardly curved section disposed rearwardly of said windshield frame, said curved section being connected to said windshield frame and serving as rearwardly facing wall portions of said cold air-receiving chamber and as an upwardly facing wall and a rearwardly facing wall of said hot air-receiving chamber adjacent to said cold air-receiving chamber, said rearwardly extending section forming the bottom wall of said cold and hot air-receiving chambers, said curved section having ports formed therein for establishing air flow communication between said cold air-receiving chamber and the interior of said operator's compartment and transversely spaced slots for directing heated air from said hot air-receiving chamber at the base of said windshield frame, said rearwardly extending section being provided with an opening for admitting heated air to said hot air-receiving chamber.

7. The combination as set forth in claim 6, in which, each port is provided with a pivotally mounted, curved closure member swingable about a substantially horizontal axis spaced above said port to a position to close said port and lie substantially flush with the curved cowl bar surface adjacent the port, said closure members serving as deflectors when pivoted relative to said cowl bar about said horizontal axes to direct the air from said cold air-receiving chamber downwardly into said operator's compartment.

8. In a motor vehicle, the combination of a body panel having a ventilating opening therein, of a closure member for said opening; means for pivotally connecting one edge of said closure member to one side of said panel; means for releasably locking said closure member in its closed position; and gripping means to adjust the open position of said closure member with respect to said panel, said means including a bracket fixed to said panel having an opening therein, an elongated spring member having one end pivotally connected to said closure member for pivotal movement about the axis substantially parallel to the pivotal axis of said closure member extending through said opening, said elongated spring member being yieldably urged in a direction substantially parallel to the pivotal axis of said closure member into frictional engagement with said bracket.

9. The combination as set forth in claim 8, in which a plurality of notches are formed on said elongated spring member, each of said notches corresponding to a particular open position of said closure member, and the end of said elongated member opposite its connection to said closure member is provided with an off-set extension for engaging said bracket to limit the outward pivoting movement of said closure member.

10. In a motor vehicle, the combination of a body panel having a ventilating opening therein, of a closure member for said opening; means for pivotally connecting one edge of said closure member to one side of said panel; a bracket secured adjacent one edge of said opening to the opposite side of said panel, said bracket having a projection extending from said panel and a keeper portion, said projection being provided with an open-ended slot extending in a direction parallel to the pivotal axis of said closure member; an elongated spring member having one end pivotally connected to said closure member and extending through said slot, said spring member being yieldably urged toward the base of said slot into frictional engagement with said projection and having a plurality of notches formed thereon to hold the closure member in a plurality of open positions; a releasable latch element rotatably carried by said closure member movable into engagement with said keeper portion when said closure member is in its closed position; and a stop lug formed on said bracket adjacent said keeper portion disposed in the path of movement of said latch element to limit the rotational movement thereof.

11. The combination as set forth in claim 10 in which the end of said spring member opposite its connection to said closure member is provided with an off-set extension for engaging said bracket to limit the outward pivoting movement of said closure member.

References Cited in the file of this patent

UNITED STATES PATENTS

| | | |
|---|---|---|
| 1,346,383 | Raab et al. | July 13, 1920 |
| 1,438,016 | Bourke | Dec. 5, 1922 |
| 1,670,090 | Achen | May 15, 1928 |
| 2,045,044 | Modine | June 23, 1936 |
| 2,045,578 | Buford | June 30, 1936 |
| 2,173,893 | Wermich | Sept. 26, 1939 |